(12) United States Patent
Geay et al.

(10) Patent No.: US 9,470,549 B2
(45) Date of Patent: Oct. 18, 2016

(54) HYBRID ARCHITECTURE FOR AN AIRCRAFT SYSTEM

(71) Applicants: Airbus Operations (SAS), Toulouse (FR); Airbus SAS, Blagnac (FR)

(72) Inventors: Xavier Geay, Tournefeuille (FR); Guillaume Rolland, Tournefeuille (FR); Julien Brisard, Tournefeuille (FR); Sebastien Barthelme, Launaguet (FR); Vincent Jaduad, Colomiers (FR)

(73) Assignees: AIRBUS OPERATIONS (SAS), Toulouse (FR); AIRBUS SAS, Blagnac (FR)

( * ) Notice: Subject to any disclaimer, the term of this patent is extended or adjusted under 35 U.S.C. 154(b) by 0 days.

(21) Appl. No.: 14/138,500

(22) Filed: Dec. 23, 2013

(65) Prior Publication Data

US 2014/0180507 A1    Jun. 26, 2014

(30) Foreign Application Priority Data

Dec. 21, 2012 (FR) .................................... 12 62722

(51) Int. Cl.
| | | |
|---|---|---|
| *G01C 23/00* | (2006.01) | |
| *G05D 1/00* | (2006.01) | |
| *G05D 3/00* | (2006.01) | |
| *G06F 7/00* | (2006.01) | |
| *G06F 17/00* | (2006.01) | |
| *G08G 5/00* | (2006.01) | |

(52) U.S. Cl.
CPC ............. *G01C 23/00* (2013.01); *G08G 5/0021* (2013.01)

(58) Field of Classification Search
USPC ............. 701/3, 114, 400, 24, 409, 410, 411, 701/413; 244/75 R, 175, 75.1
See application file for complete search history.

(56) References Cited

U.S. PATENT DOCUMENTS

| | | | |
|---|---|---|---|
| 6,317,659 B1* | 11/2001 | Lindsley et al. ................... 701/1 |
| 2006/0031006 A1* | 2/2006 | Stenbock et al. ............. 701/200 |
| 2009/0105943 A1* | 4/2009 | Ferro et al. .................... 701/202 |
| 2009/0150012 A1* | 6/2009 | Agam et al. ....................... 701/3 |
| 2010/0049378 A1* | 2/2010 | Hiale-Guilhamou et al. .... 701/3 |

\* cited by examiner

*Primary Examiner* — Ronnie Mancho
(74) *Attorney, Agent, or Firm* — Greer, Burns & Crain, Ltd.

(57) ABSTRACT

A method of configuring an aircraft management system comprising the following steps, implemented by a configuration module integrated into the avionic system of the aircraft cockpit: obtaining at least one item of computation data for computing at least one configuration parameter of the management system, sending, to a computation module that is independent from the avionic system of the aircraft cockpit, a request for computing said at least one parameter on the basis of said at least one item of computation data, receiving, from said computation module, said at least one computed parameter, and configuring said management system with said at least one received computed parameter.

15 Claims, 13 Drawing Sheets

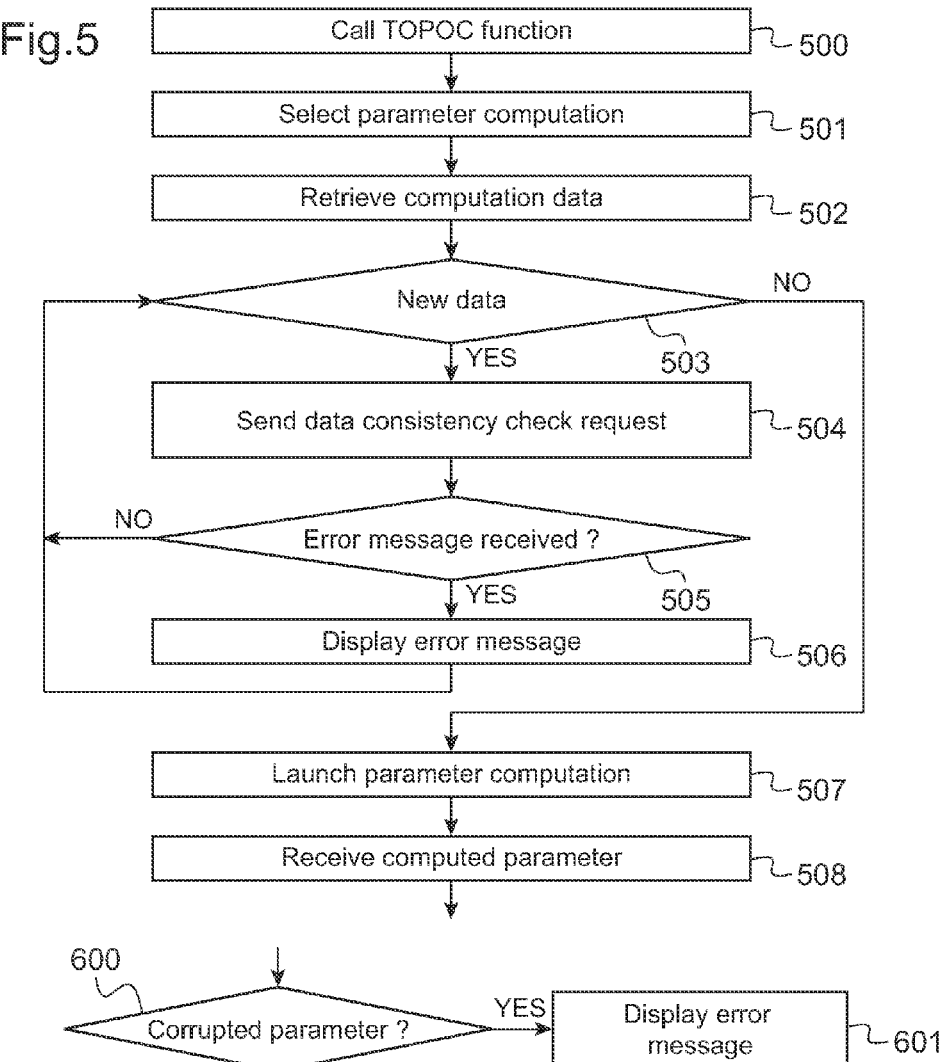
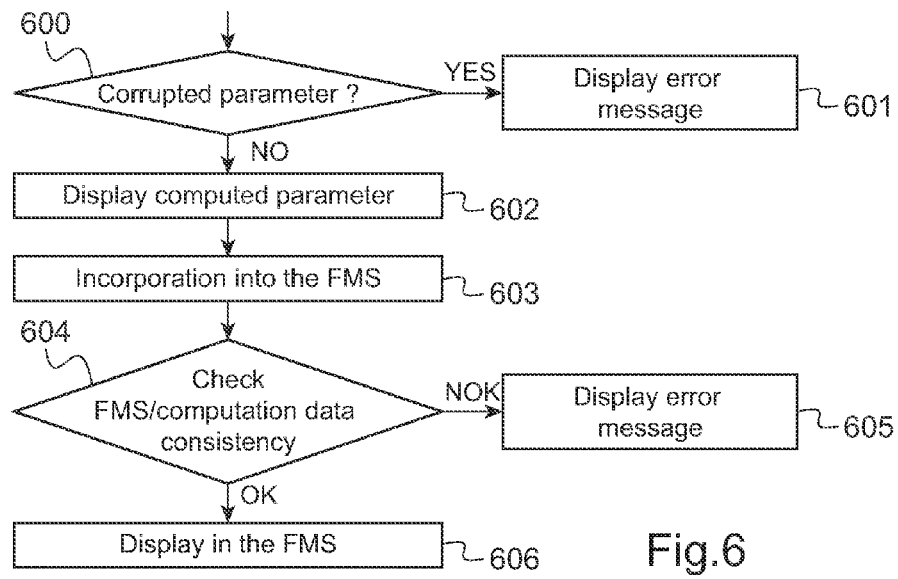

Fig.10

| ACTIVE ▼ | POSITION ▼ | SEC INDEX ▼ | DATA ▼ |

ACTIVE/PERF

CRZ FL ▼ 150    OPT FL 270    REC MAX FL 330

\T.O / CLB \ ENRTE \ DES \ APPR \ GA

LFBO    RWY 14L    T.O SHIFT    100 FT

T.O PERF COMPUTATION — 100         OAT 15 °C

V1  000 KT        F1 145 KT    ○ UPRATED
VR  000 KT        F2 130 KT    ● TOGA
V2  000 KT        O  180 KT    ○ DERATED

FLAPS ▼    THS FOR --.- %    OPERATING STD  NOS ▼

THR RED  1999 FT
ACCEL    3499 FT
TRANS    5000 FT    EO ACCEL  1999 FT

F-PLN    MISSION

CLEAR INFO

| TAKEOFF ▼ | LANDING ▼ | | TOPOC |

TOPOC/TAKEOFF/ACTIVE/COMPUTATION

RETRIEVE FM DATA    OPERATING STD  NOS ▼

ARPT  LFBO          ELEVN  489 FT   OBST  Ø
RWY   14L  ▼   NEW  TORA   3000 M   MORE/MODIFY

MAG WIND ▼  000°   00 KT         OAT  15 °C
     QNH  0000    RWY COND  ▼

ACFT CONFIG   AIR COND  ON ▼    A-ICE  OFF ▼
CG OPTION  < 30% ▼           LAT IMBAL  < 5T.M ▼
TOW  101.5 T

FLAPS  2  ▼

PWR  TOGA ▼

FM/T.O   TOPOC   KFLR87F4              COMPUTE

CLEAR INFO

| TAKEOFF ▼ | LANDING ▼ | | TOPOC |

TOPOC/LANDING/ACTIVE/COMPUTATION

RETRIEVE FM DATA   OPERATING STD [NOS ▼]
COMPUTATION TYPE [DISPATCH ▼]

ARPT [LFPG]   ELEVN 318 FT   SLOPE +1.0%
RWY [26R ▼] [NEW]   LDA 4215 M   [MORE/MODIFY]

[MAG WIND ▼] [010°] [15 KT]   OAT [15 °C]
QNH [1013]   RWY COND [WET ▼]

[ACFT CONFIG]   AIR COND [ON ▼]   A-ICE [OFF ▼]
CG OPTION [< 30% ▼]   LAT IMBAL [< 5T.M ▼]
LW [94.4 T]

LDG FLAPS [FULL ▼] ⎫
APPR TYPE [STEEP ▼] ⎬ —120, 121
LDG MODE [AUTOLAND ▼] ⎭

☑ A/THR
SPD INCR (USER) [+0 KT]
LS SLOPE [-5.0°]
MIN GA GRAD [2.7 %]

GND IDLE [130 KT ▼]

123 — [COMPUTE]

FM/APPR  TOPOC  KFLR87F4

[CLEAR INFO] [AUTOLAND NOT ALLOWED WITH STEEP] —122

| ACTIVE ▼ | SEC1 ▼ | SEC2 ▼ | SEC3 ▼ |

ACTIVE/T.0/PERF RESULTS TOPOC

OPERATING STD   NOS

ARPT  LFBO  ⌐131      ELEVN   488 FT      OBST  Ø
RWY   14R   ⌐132      TORA    3500 M      MORE

MAG WIND   ▼  000°     0 KT        OAT   20 °C
   QNH  1013      RWY COND   DRY

ACFT CONFIG    AIR COND  ON        A-ICE  OFF
CG OPTION  < 25%              LATERAL CG  NORMAL

RESULTS  /  SECONDARY RESULTS                    133

V1   101 KT                  TOW          110 T
VR   114 KT      TOGA    MTOW (PERF)      155 T
V2   125 KT                               NO REV

FLAPS   2              EXTRA STOP      2309 M
LIMITATION   NONE      EO ACCEL ALT    1988 FT

FM/T.0  | VIEW INPUTS |      PRINT     | INSERT IN T.0 PAGE |
CLEAR INFO | TOPOC / FM RWYs DISAGREE ⌐ 130
                                      134
P(Y) 0.01

Fig.14

| ACTIVE ▼ | POSITION ▼ | SEC INDEX ▼ | DATA ▼ |

ACTIVE/PERF

CRZ FL ▼ 150    OPT FL 270    REC MAX FL 330

LFBO   RWY 14L   T.O SHIFT  100 FT    0 FT — 1401
                            ⌒1407

T.O PERF COMPUTATION                  OAT  15 °C  15 °C
                  ⌒1400                    ⌒1408  ⌒1402
V1  --- KT  102 KT   F1  145 KT ⌒1406
VR  --- KT  112 KT   F2  130 KT    TOGA ⌒1409  TOGA
V2  --- KT  123 KT   0   180 KT    1400        1403

FLAPS  2    THS FOR  ---.-%    OPERATING STD  NOS ▼
                                               NOS
THR RED  1999 FT                                ⌒ — 1410
ACCEL    3499 FT         1411    1405          1404
TRANS    5000 FT    EO ACCEL  1999 FT  1989 FT

CONFIRM
                                    T.O PERF

F-PLN   MISSION

CLEAR
INFO

P(Y) 0.01

HYBRID ARCHITECTURE FOR AN AIRCRAFT SYSTEM

CROSS-REFERENCES TO RELATED APPLICATIONS

This application claims the benefit of the French patent application No. 1262722 filed on Dec. 21, 2012, the entire disclosures of which are incorporated herein by way of reference.

BACKGROUND OF THE INVENTION

The present invention concerns the on-board configuration for a management system of an aircraft (for example an airplane). This may for example be a flight management system, a navigation system, a system for managing an aircraft on the ground, a maintenance management system or other system.

To make a flight, the crew has at its disposal a certain number of documents which may be directly available on board the aircraft or which may be brought on board the aircraft by the crew at each flight.

The documents available on board are for example:
the technical documentation of the aircraft (description of the systems and procedures, tolerances, MEL, which stands for Minimum Equipment List, CDL, which stands for Configuration Deviation List, or other document),
the operational documentation of the company utilizing the aircraft,
the performance on take-off, landing and in flight, and/or
the navigation and airfield maps.

The documents provided by the pilot for a given flight are for example the flight folder (flight plan, meteorological maps, or other documents).

In aircraft, the flight management system (of which the abbreviation is FMS) enables a flight plan to be constructed and followed while taking into account constraints on aeronautical navigation and performance relative to the aircraft and its environment.

The flight management system forms part of the avionic system of the aircraft integrated into the cockpit, that is to say the on-board electronic system in the aircraft which has been certified for piloting.

For example, to parameterize this flight management system, the crew has documentation at its disposal for computing the performance of the aircraft on take-off and on landing.

This paper documentation takes the form of tables and charts. It enables estimation of the performance parameters useful for the configuration of the flight management system to undertake take-off and landing, based on aircraft and environmental data.

The aircraft data are for example:
the loading parameters of the aircraft: mass and mass distribution, quantity of fuel taken on board, and/or
the configuration of the aircraft: systems used affecting the performance of the aircraft (devices using up the power of the engines or degrading the aerodynamic performance of the aircraft) and systems that have failed or are absent and which affect performance.

The environmental data are for example:
The parameters of the runway used: state of the surface (type of surface and state according to the weather), slope, type of approach used in the case of a take-off, obstacles along the path of climb or descent, and/or the weather conditions: temperature, atmospheric pressure, wind.

The flight data are not necessarily exactly those given as input for the tables and charts. The crew thus chooses values from its documentation that are as close as possible to the real situation to estimate the performance parameters for take-off and for landing.

The estimated performance for take-off and landing are used in particular to:
ensure that the available runway length is sufficient, and/or
perform the take-off or landing maneuver at the speeds and slopes given by the computation.

These data may also be input into the FMS for managing the flight plan.

Formerly, the documentation was transported by the pilots in a bag. They only used paper format to carry out the computations of parameters to configure the flight management system.

The pilot chose an input value from among those given in the tables of the paper documentation, trying to get as close as possible to the value he needed.

The pilot then estimated a value close to his results by increasing or reducing them according to the disparity relative to his input data. In the end, the results obtained were not fully optimized.

Furthermore, a limited number of input parameters could be taken into account. Adding parameters to refine the results required adding more tables and computing steps, which rendered the configuration more complex.

With the use of the paper format, the computation of the parameters was entirely separated from the flight management with the avionics of the aircraft. Indeed, the pilot had to take the input data from his systems in his paper documentation, perform his computation manually then copy back the performance data into the flight management system interface. This created a risk of error and broke the workflow with the avionic system of the aircraft, which limited the ergonomics of the cockpit.

More recently, the documentation contained in a bag has been replaced by a computer device designated by the initials EFB (for "Electronic flight bag"). The EFBs enable computations of high precision to be carried out thanks to the use of more complex and precise computation formulae, which is not possible with the paper format and the use of charts.

A current EFB, as illustrated in FIG. 1, takes the form of a computer 10 (for example a portable PC, a tablet or other device), with a dedicated screen enabling documents and maps to be viewed as well as the use of software applications for calculating performance for each phase of flight (mass and balance, take-off performance, landing performance, performance in flight, or other performance).

The EFBs may be connected to the avionic system, for example via a connection cable 12 in order to retrieve certain general avionic parameters such as the origin and destination of the flight for example. This connection is thus made in a single direction, the data going from the avionic system to the EFB.

The EFB is considered as a system belonging to "the open world", that is to say it does not belong to the avionic system.

The open world systems may be disposed in an aircraft for use dedicated to piloting or to the provision of functionalities in the passenger cabin. They may or may not be certified. It is possible for these systems not to require certification in terms of the DO 178B standard. However, in order to be used in flight, an operational approval delivered by an aviation authority may be necessary.

Furthermore, the development of open world systems may rely on consumer technologies, such as so-called "COTS" technologies (COTS standing for "Commercial Off-The-Shelf"). This development is sometimes based on computers of "PC" type (PC standing for "Personal Computer").

The open world systems may enable the integration of applications developed by developers other than the manufacturer of the system (for example airline companies, specialist companies or other companies).

The EFB is a device operationally approved by the local authorities of each country. The EFB is thus independent from the avionic system integrated with the cockpit.

As the EFB has been operationally approved, it profits from flexibility in the management of its data and its updates as well as in the developments to its user interface. Nevertheless, communication with the avionic system (which by contrast is certified) is restricted. The EFB may receive data from the avionic system without sending any.

Thus, a current EFB of class I or II cannot supply data to the avionic system, for example to configure a flight management system with parameters it has computed.

The inability to supply EFB data to the avionic system leads to a crew procedure in which, after supplying of the results by the PF (Pilot Flying) to the avionic system, the PNF (Pilot Non Flying) must check the exact similarity between the data supplied to the avionic system and the data computed by and available in the EFB.

On account of this one-way communication, the pilot must necessarily transfer the parameters computed by the EFB to the avionic system (for example the flight management system).

On the other hand, the EFB is an "open world" device, which does not have the same level of security as the constituents of the on-board avionic system such as the flight management system FMS. It may thus retrieve certain input data from the avionics but cannot send back any, due to the risks of data corruption. The pilot must therefore manually copy computation results into the user interface of the flight management system FMS.

Furthermore, the quantity of input data which may be copied from the avionics depends on the type of EFB and the aircraft. The limitations inherent to the main data bus greatly limit the communication with a conventional computer. The data bus in aircraft are not always compatible with the data busses of conventional computers (that is to say that are non-specific to avionic systems).

Furthermore, the EFB user interface is presented on a different screen to that of the FMS. This is also the case of the keyboard (not shown) and of the touchpad (not shown) of the EFB which constitute an interface independent from the keyboard 13 and the trackball (not shown) of the FMS. There is this a break in the workflow which obliges the pilot to pass from one peripheral to the other to prepare his flight plan on the FMS, to carry out his performance computation on the EFB and include the computation results in the FMS.

Lastly, the computation capacity of avionic systems is limited, which may rule out solutions in which the optimized performance computation would be fully integrated into the avionic system. The computations to perform would not be performed in optimum conditions, as is the case with open world computers, which by contrast do have the necessary computation capacity.

Thus, there is a need to improve the configuration of the management system for aircraft, in particular the flight management systems.

The present invention lies within this context.

SUMMARY OF THE INVENTION

A first aspect of the invention concerns a method of configuring an aircraft management system comprising the following steps, implemented by a configuration module integrated into the avionic system of the aircraft cockpit:

obtaining at least one item of computation data for computing at least one configuration parameter of the management system, sending, to a computation module that is independent from the avionic system of the aircraft cockpit, a request for computing said at least one parameter on the basis of said at least one item of computation data, receiving, from said computation module, said at least one computed parameter, and configuring said management system with said at least one received computed parameter.

The method according to the first aspect provides a compromise between the use of a computation module in the "open world" (that is to say not forming part of the avionic system) to perform the computation of the parameters, and continuity of the workflow for the pilot.

For example, the management system is a flight management system, a navigation system, a system for managing an aircraft on the ground, a maintenance management system or other system.

The method relies on an architecture shared between the avionic system and the open world. The interface with the pilot and the management system is managed in the avionic system. The parameter computations are carried out outside the avionic system.

Thus, the high computation capacities given in the open world are kept while giving the pilot an interface for the configuration of the management system integrated into the avionic system.

The method may furthermore comprise, prior to sending said computing request, a step of sending, to said computation module, a request to check consistency of said at least one item of computation data, in order for the sending of the computing request to be made according to said consistency check.

Thus, it is possible to detect errors in the data to process before launching the computation of parameters. This avoids the avionic system receiving erroneous parameters.

This measure reinforces the communication between the configuration module in the avionic system and the computation module which in contrast forms part of the open world.

For example, said consistency check request concerns a block comprising a plurality of items of computation data.

Thus, the stream of communication between the configuration module and the computation module is optimized.

Furthermore, it is thereby possible to perform a check of consistency of the data relative to each other, for example by detecting two items of computation data that are incompatible with each other.

This measure may also reinforce the communication between the avionic system and the computation module which is not part thereof. It may enable input errors by the pilot to be dealt with as they are entered into the avionic system. It thus avoids an accumulation of errors throughout the length of the process of input by the pilot, which in the end may become difficult to correct logically due to there being too many errors.

Further to receiving said at least one computed parameter, the method may furthermore comprise a step of checking for corruption of the items of computation data.

This step makes it possible to reinforce the security of the communication of the avionic system by protecting it from errors due to the sending of the computed parameter. The checking may for example be carried out within the avionic system.

For example, said at least one computed parameter is accompanied by at least one item of computation data used by the computation module to compute it, and said step of checking for corruption of the items of computation data comprises comparing said at least one determined item of computation data and said at least one item of computation data used to compute said at least one computed parameter.

The method may furthermore comprise a step of checking the integrity of said at least one received computed parameter.

Thus, before accepting the parameter computed by the computation module, the configuration module may check that it has been computed in accordance with its request.

Thus measure also makes it possible to provide greater security for communication with the computation module of the open world.

For example, said integrity check comprises a comparison of two records, of the same at least one computed parameter, received from the computation module. These two records may for example belong to the same message sent by the computation module.

The step of obtaining the item of computation data may comprise receiving it via a user interface of the configuration module.

Alternatively, or in combination, it may comprise receiving that item of computation data, via an interface for communication with a computation data supply module.

The item of data is then obtained automatically, without involvement by the pilot. This obtaining mode may be implemented when for example, the pilot has already input that item of data into a system other than the configuration system.

A second aspect of the invention concerns a device for implementing a method according to the first aspect.

For example, such a device for configuring an aircraft management system is integrated into the avionic system of an aircraft cockpit and it comprises:

a processing unit configured to obtain at least one item of computation data of at least one configuration parameter of the management system, the processing unit being furthermore configured to configure said management system with said at least one received computed parameter, and a communication unit configured to send, to a computation module independent from the avionic system of the aircraft cockpit, a request for computing said at least one parameter on the basis of said at least one item of computation data, the communication unit being furthermore configured to receive, from said computation module, said at least one computed parameter.

A third aspect of the invention concerns a system for implementing a method according to the first aspect.

For example, such a system for configuring an aircraft management system comprises:

a configuration device integrated into the avionic system of a cockpit of the aircraft, the device comprising:

a processing unit configured to obtain at least one item of computation data of at least one configuration parameter of the management system, the processing unit being furthermore configured to configure said management system with said at least one received computed parameter, and a communication unit configured to send, to a computation device independent from the avionic system of the aircraft cockpit, a request for computing said at least one parameter on the basis of said at least one item of computation data, the communication unit being furthermore configured to receive, from said computation device, said at least one computed parameter, and the system further comprises:

said computation device independent from the avionic system of the aircraft cockpit, the computation device comprising:

a processing unit configured to compute, on the basis of received items of computation data, said configuration parameter, and a communication unit configured to receive, from the configuration device, said computing request, and to send, to said configuration device, said computed configuration parameter.

A fourth aspect of the invention concerns an aircraft comprising a device and/or a system according to the second and/or third aspects.

A fifth aspect of the invention concerns a computer program as well as a computer program product and a storage medium for such programs and product, enabling the implementation of a method according to the first aspect when the program is loaded into and executed by a processor of a device and/or a system for configuring an aircraft management system.

The second, third, fourth and fifth aspects of the invention procure at least the same advantages as those procured by the method according to the first aspect.

BRIEF DESCRIPTION OF THE DRAWINGS

Other features and advantages of the invention will appear on reading the present detailed description which follows, by way of non-limiting example, and of the appended drawings among which, FIG. 1 schematically shows an electronic flight bag EFB in use;

FIGS. 5 and 6 are flowcharts of steps implemented according to some embodiments;

FIGS. 10 to 14 illustrate user interfaces according to some embodiments; and

DETAILED DESCRIPTION OF THE PREFERRED EMBODIMENTS

The configuration mode of the aircraft management system described below is based on the execution of the computation of configuration parameters by a computation module of the open world (computers of the open world in general have sufficient power to perform the computations within a reasonable time) and on the management of the user interface on a computer of the avionic domain. The following part of the description takes the example of a flight management system.

The configuration mode of the flight management system presented below makes it possible to obtain the advantages of a computation solution that is fully integrated into the avionic system (single interface), while avoiding the problems of performance linked to transferring the computation engine to a computer of the avionics.

The solution to the problems of security of data transfer between the EFB open world and the avionic domain, as well as the problem of breakage of the workflow consisting of integrating the software application for computing take-off and landing performance directly into the avionics, may be not optimal.

The computation power incorporated into a computer of the avionic domain is appreciably less than that available on a computer of the open world. The time necessary for performance computation on a computer of the avionic domain would not be acceptable operationally.

Furthermore, the transfer of the algorithms for performance computation to a certified platform (for example of DO-178 type) would be extremely complex, and would degrade the performance of the algorithm. As a matter of fact, the commonly used certified compilers for avionics are based on the C or ADA languages, and do not give such good performance as languages such as Fortran for recursive algorithms. Yet, that type of language is greatly used for computations of configuration parameters for flight management systems (recursive algorithms).

The systems and devices integrated into the cockpit form part of the avionic domain. The integration into the cockpit is thus understood as being the integration into the avionic system. An open world device may be physically installed in the cockpit without however belonging to the avionic system and thus being "integrated" therein in the sense meant in the following part of the description.

The architecture described below is thus based both on the avionic system and on an external system, independent from the cockpit and belonging to the open world (that is to say non-avionic). It is thus a hybrid architecture between those two types of systems.

Figure 1:
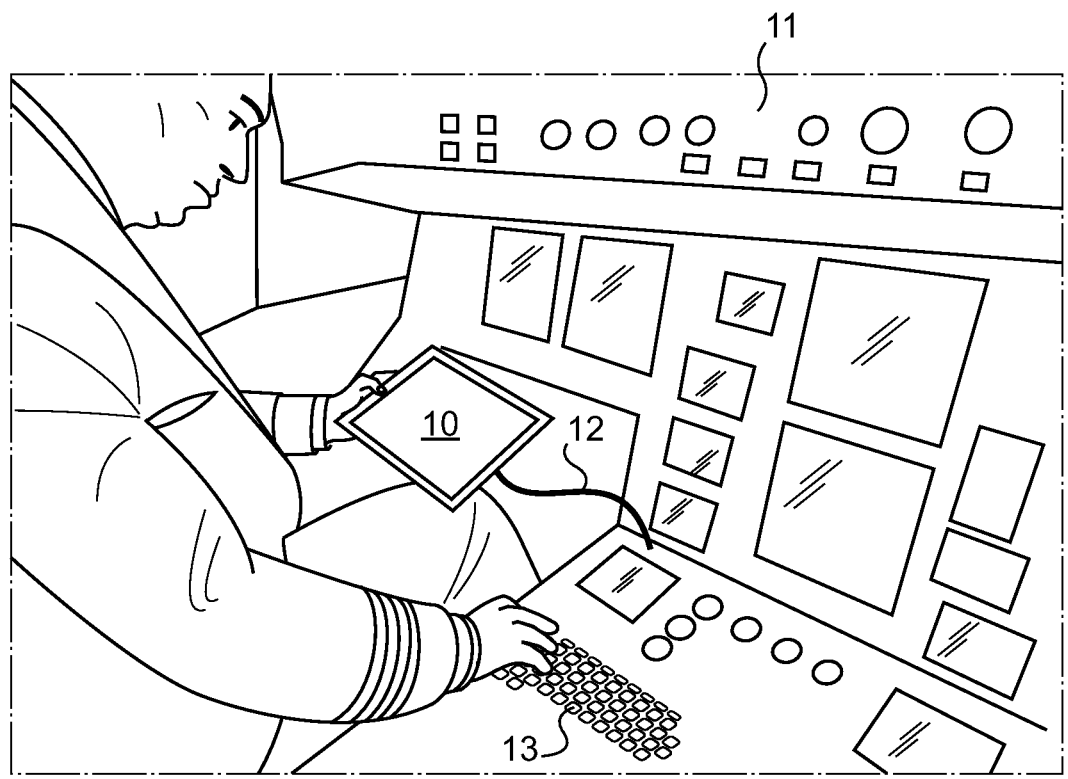
Figure 2:
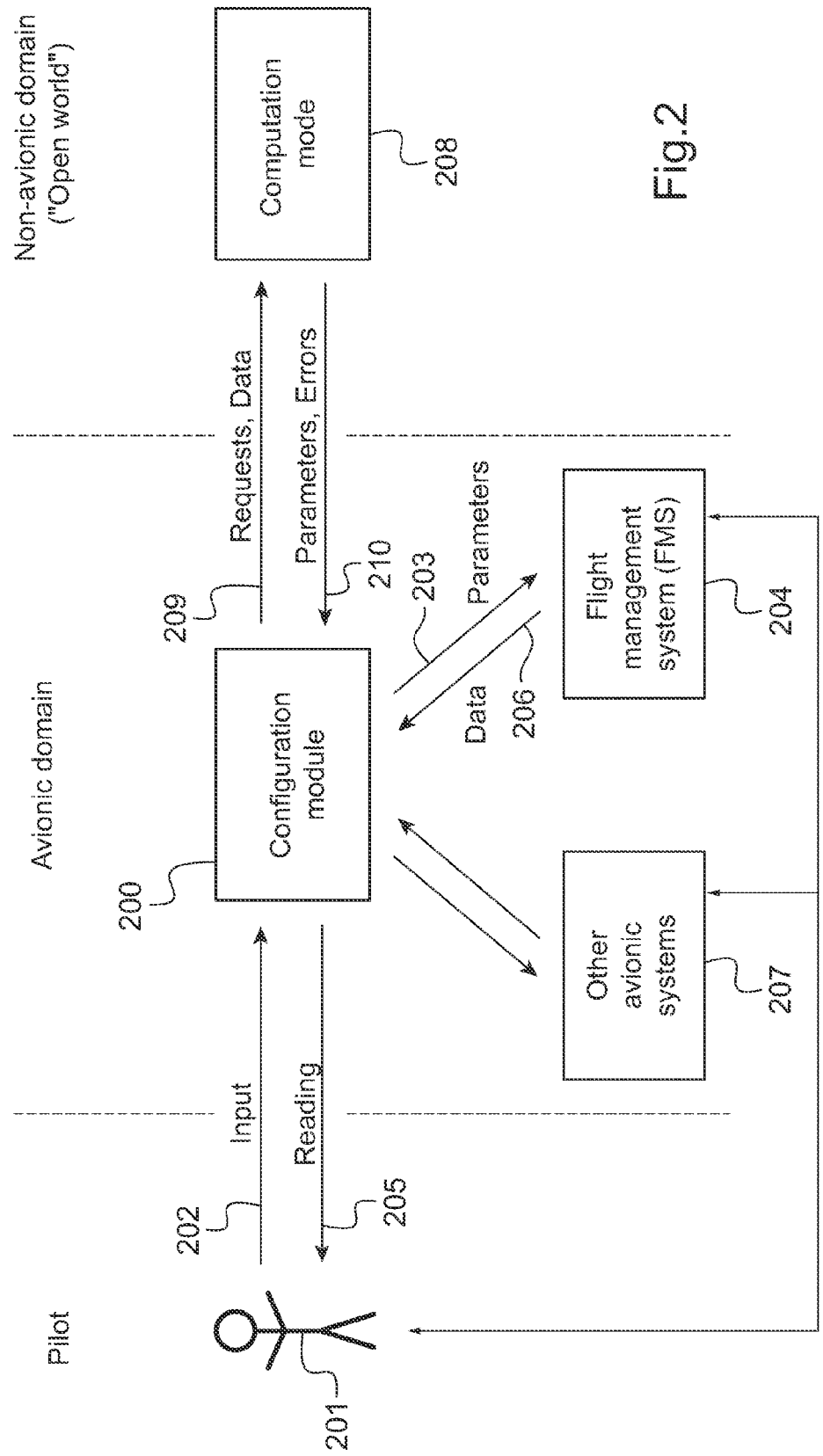
FIG. 2 diagrammatically illustrates an architecture according to some embodiments.

This architecture is diagrammatically represented in FIG. 2.

A configuration module 200 forms the interface with the pilot 201. The pilot may enter items of computation data 202 to compute configuration parameters 203 of a flight management system (FMS) 204. The configuration module may furthermore display an interface 205 for the pilot in order for him to read the input data and the computed parameters.

The configuration module communicates with the flight management system to send the computed configuration parameters It may furthermore receive data 206 from the flight management system, in order to display them to the pilot and/or to use them for the computation of parameters.

The interface between the pilot and the flight management system may however be kept. The pilot may continue to directly obtain data from the flight management system. The pilot may also continue to directly enter data into the flight management system. This interface is represented by the arrow 211.

The interface between the pilot and the other avionic systems may also be kept. The pilot may continue to directly obtain data from the other avionic systems. The pilot may also continue to directly enter data into the other avionic systems. This interface is represented by the arrow 211.

The configuration module may furthermore communicate with other avionic systems 207. This may for example be the AOC (standing for Airline Operational Control) to retrieve and decode the content of meteorological reports (METAR, standing for METeorological Aerodrome Report) and thus automatically fill in the meteorological conditions necessary for the parameter computation.

This make may it possible for example, when a failure occurs in flight, to retrieve the failure data from the ECAM (standing for Electronic Centralized Aircraft Monitoring) and to pre-select the MEL or CDL items concerned in the configuration module for the landing or next take-off. The pilot may then compute his capacity to land on the initially planned landing site and decide where appropriate on a diversion, or the pilot may also compute his capacity to take-off again from the initially planned landing site and decide on the necessity of a repair.

The configuration module furthermore communicates with a computation module 208 (which may for example be a computer of the open world) given the task of performing the computations of parameters requested by the pilot, via the configuration module. To that end, the configuration module sends requests 209 to the computation module, which may be accompanied by items of computation data. In return, the configuration module receives computed parameters 210 and/or error messages from the computation module.

The computation module may contain various databases (not shown), and/or communicate with such databases which are external (not shown). These may in particular be:

an airport database that contains the parameters (for example the length, or other parameter) of all the runways used for the computation, an aircraft database which contains parameters on the performance of the aircraft and which are used by the computation engine, and/or customization data which will for example give the content of the scrollable lists used in the interface of the configuration module.

All the configuration and customization data may be stored within the computation module, in the open world, to facilitate the administration and the updating of the system.

An administration tool on a separate computer which is connected to the computation module may enable these data to be administered. Also for example, an administration tool may generate a set of electronically signed files capable of being loaded into the NSS in order to refresh or modify the configuration and customization data used by the computation module. It is thus easy to update a high number of parameters having an effect on the parameter computation, the interface, or the databases used by the pilot (runways, performance databases, etc.).

Given that the configuration and computation modules may respectively interface with the systems of the avionic domain and of the open world, it is possible to increase the interactivity of the parameter computation.

For example, the computation module may retrieve the MEL/CDL items (MEL/CDL standing for Minimum Equipment List/Configuration Deviation List) from the aircraft documentation stored in the open world and transfer the useful items to the configuration module. When an ECAM failure occurs in flight (ECAM standing for Electronic Centralized Aircraft Monitoring), this may for example make it possible to retrieve the associated MEL items from the computation, for the next take-off. Depending on the possibility of a repair at the next stage, the pilot may then check his capacity to take off again from that stage with that failure.

Considered below, by way of illustration, is the configuration of a flight management system with the computation of the take-off and landing performance of the aircraft. This computation will be designated by the acronym TOPOC (for "TakeOff and landing Performance Optimization Computation").

Below, the configuration module integrated into the avionic system is called TOPOC-HMI. This module manages the display on the screen of the cockpit and the interfaces with the other avionic systems such as the flight management system FMS. Moreover, the computation module which is independent from the cockpit and from the avionic system is called TOPOC-NSS. This module hosts the engine for computation of the configuration parameters. It may furthermore comprise databases used for the computation as well as the configuration data of the user interface of the TOPOC-HMI module. Alternatively, these databases are external to the computation module which may communicate with them.

The communication between the two modules relies on several mechanisms operating separately:
 a mechanism for initializing the application,
 a mechanism for checking the consistency of the data input by the pilot, and
 a mechanism for checking the corruption of the data.

These mechanisms enable the use of data coming from the open world in the avionic domain with an acceptable level of security.

The TOPOC-HMI configuration module enables a user experience to be provided that is integrated into the rest of the avionic equipment (in terms of operational tasks for the pilot and in terms of user interface).

Figure 3:
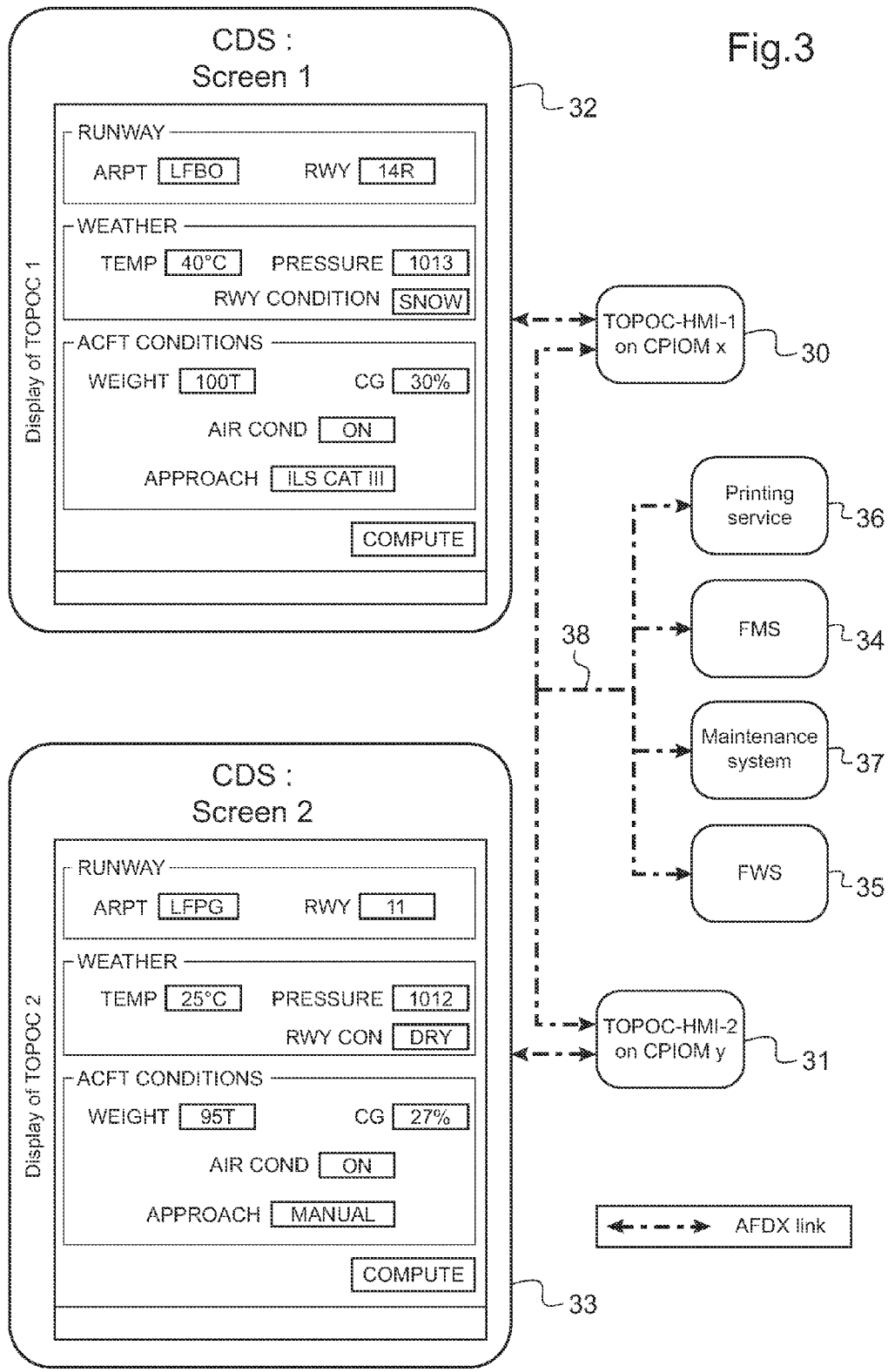
FIG. 3 illustrates an example of installation of a system according to some embodiments.

For example, as illustrated by FIG. 3, the "TOPOC-HMI" module is constituted by two identical and independent entities 30, 31, each dedicated to a pilot. Each entity acts as a client enabling the pilot to consult his performance data on screens 32, 33, to modify them, to execute computations and integrate them into his flight plan in the flight management system FMS 34.

Each entity is installed on a standardized avionic computer designated CPIOM (standing for Core Processing Input/Output Module).

The configuration module communicates with the CDS (standing for Control and Display System) of the avionic system to provide an interface to the pilot. For example, this interface appears on the same screen as that displaying the interface of the flight management system FMS. The pilot may then simply pass from one interface to the other using shortcuts (buttons in the interface).

The TOPOC-HMI configuration module may also communicate with other avionic systems. For example, it may communicate with the flight management system FMS to retrieve the flight plan information (runway used, loading data, or other information) and so avoid making inputs twice over. It may also communicate with the flight management system FMS to send computation results (flap configuration, speeds of maneuvers, or other results) and thus avoid the burdensome nature of the copying task, avoid copying errors, avoid the operational procedure that requires the PNF (standing for Pilot Non-Flying) to carry out a check between the data incorporated by the PF (Pilot Flying) and his results.

Two pilots may perform two independent calculations and check the similarity of their results, in order to avoid an input error in the inputs for the computation.

Also for example, the TOPOC-HMI configuration module may communicate with the FWS 35 (FWS standing for "Flight Warning System") to generate warnings in case of failure preventing the TOPOC computation.

The TOPOC-HMI configuration module may furthermore communicate with other systems or devices of the aircraft such as the printer 36 to print the computation results, the maintenance system 37 to record the failures encountered, or other systems or devices.

For example, all these communications are made via a bus 38 of AFDX-certified Ethernet type (AFDX standing for Avionics Full Duplex Switch Ethernet).

The CPIOM computers used for the configuration module do not generally have the necessary power for the parameter computations. Thus, the configuration module manages the interface with the pilot and with the other systems but does not manage those computations. These are delegated to the external computation module belonging to the TOPOC-NSS open world.

Figure 4:
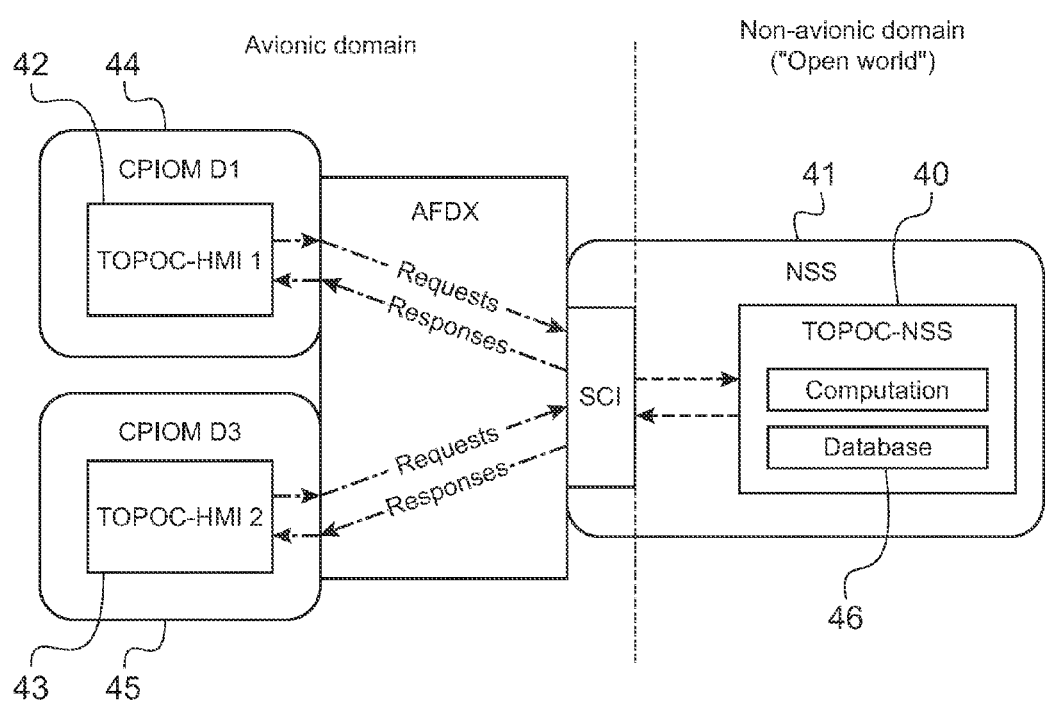
FIG. 4 illustrates the interactions of a configuration module with a computation module according to some embodiments.

As illustrated in FIG. 4, this computation module 40 may be installed in a computer 41 designated by the abbreviation NSS (standing for "Network Server System").

The computation module thus may or may not be installed in the avionic bay.

The TOPOC-NSS module is a module that is independent from the avionic bay, from the avionic system or from the cockpit. Nevertheless, this independence does not mean that this module cannot be physically integrated (or fixed) to the cockpit.

The use of an open world module enables the use of more diverse computer languages, more flexibly (for example the java or .net languages). The use of an avionic module sometimes requires the use of languages which may be less adapted to the parameter computations than those available for the computer systems belonging to the open world. Thus, the development and the maintenance of the applications of the computation module are facilitated. Flexibility is also increased.

The computer code embedded in the computation module may also be more optimized (use of efficient compilers and languages, for example such as Fortran, that are much faster for recursive computations such as those carried out by the computation module than the C language as certified.

Furthermore, a computation module belonging to the open world may use electronic and computation components that are much more powerful than the equipment used on the CPIOMs.

The TOPOC-NSS module communicates with the TOPOC-HMI configuration modules 42, 43 implemented in the avionic domain by the CPIOM computers 44, 45.

The TOPOC-NSS module also communicates with certain databases 46 installed in the NSS. For example the database containing all the parameters of the airports and runways necessary for the performance computation.

The hybrid architecture of the configuration system may for example implement a client-server type mechanism: the TOPOC-HMI clients provide an interface to the crew and to the avionic applications. They then communicate with the TOPOC-NSS server which takes on the task of the parameter computations.

The NSS also has available a gateway 47, the SCI (standing for Secure Communication Interface), which enables it to communicate by AFDX with the avionic systems. This gateway makes it possible to perform communications between the avionic domain and the open world. Within the NSS, that is to say behind the SCI and thus in the open world, the communications are no longer made via AFDX.

Mechanisms may enable data to be transferred from the open world to the avionic world and to transfer data from the avionic world to the open world. These mechanisms are directed for example to ensuring sufficient security for the use of the data in the avionic domain, so enabling use of the data to be ensured with the same risk of error as with a manual input as is the case with paper documentation (or a conventional EFB).

FIG. 5 is a general flowchart of the steps implemented in some embodiments to obtain a computed parameter. For example, these steps are implemented by a configuration module such as discussed earlier.

At a step 500, on actuation by the pilot, the configuration parameter computation function of the aircraft flight management system is called. The pilot then selects the parameter computation at a step 501. For example, the pilot clicks on an interface button. Next, the items of computation data are retrieved by the configuration module, either automatically from other systems, or further to inputs by the pilot on an interface (keyboard, touch screen, or other interface).

When a new item of data (or group of data) is retrieved (step 503, YES) a request to check the consistency of that data (or group of data) is sent to the computation module at a step 504.

A waiting step 505 of waiting for the reception of an error message is next carried out. In case of reception of such a message (YES), a display step 506 of displaying an error message is executed. Otherwise (NO), the process resumes at step 503, while waiting for the retrieval of a new item of data.

The process is also resumed at step 503, after step 506, once the cause of the error message has disappeared. When there is no further new item of data to retrieve (step 503, NO), a step 507 of launching the parameter computation is carried out. For example, the pilot clicks on a button for that purpose. A parameter computing request is then sent to the computation module.

At a step 508, the computed parameter is received by the computation module.

FIG. 6 is a general flowchart of the steps implemented in some embodiments for checking the computed parameters. For example, these steps are implemented by a configuration module such as discussed earlier.

These steps for example follow on from those presented with reference to FIG. 5.

At step 600, it is determined whether the computed parameter is corrupted. If that is the case (YES), an error message is displayed to the pilot at a step 601. Otherwise (NO), the computed parameter is displayed at a step 602. The incorporation of this parameter into the flight management system FMS is then launched at a step 603. For example, the pilot clicks on a button.

By way of checking, it may be determined prior to the full incorporation of the parameter into the flight management system whether the items of computation data used to compute the parameter are consistent with the data already present in the flight management system. This verification is carried out at step 604. If the data are not consistent (NO), an error message is displayed at step 605. Otherwise (YES), the parameter is finally incorporated into the FMS and displayed at step 606.

The checking mechanisms referred to above, may make it possible to minimize the risks of errors arising from the use in a certified module of data coming from an open world module. These mechanisms are detailed below.

Figure 7A:
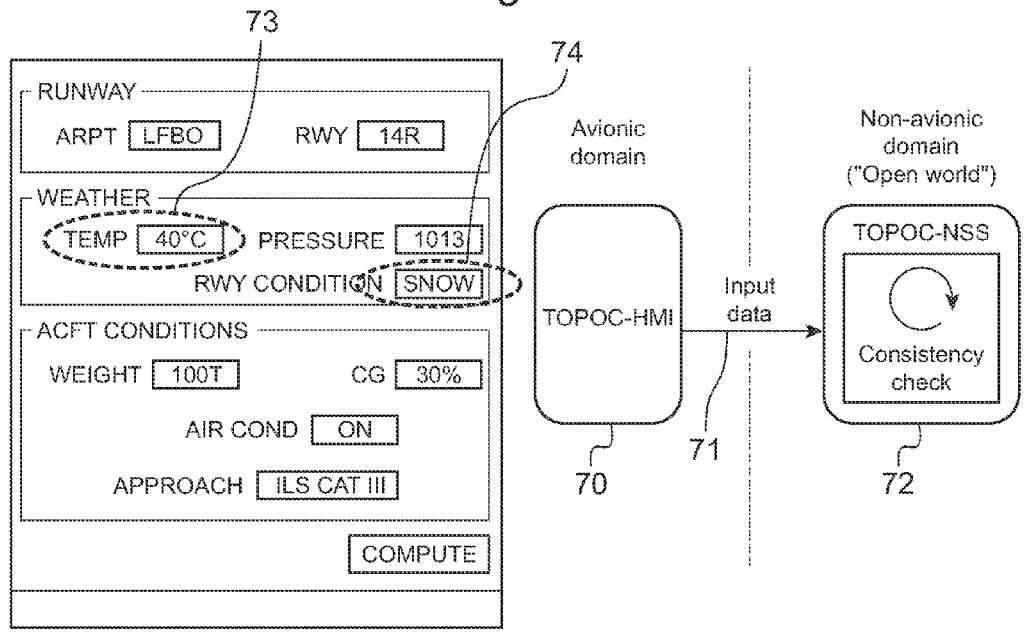
FIGS. 7a and 7b illustrate the checking of consistency of items of computation data according to some embodiments.

FIG. 7a illustrates the checking of consistency of the data sent to the computation module at the step 504 described above and illustrated by FIG. 5.

For example, when the pilot enters data into the performance computation interface in the avionic world, there is a risk of input error.

To limit this risk, the input data are regularly sent by the configuration module 70, in a message 71, to the computation module 72 in the open world which checks their consistency according to a set of rules.

In case of inconsistency, an error message is sent to the interface in the avionic domain for its display to the pilot. The latter may then correct the data concerned.

FIG. 7a presents the case where the pilot has finished entering meteorological data 73, 74. The input data are then sent to the TOPOC-NSS module to check their consistency. In this example, the pilot has entered a temperature of 40° C. and has indicated the presence of snow on the runway.

As such a temperature is incompatible with the presence of snow, an inconsistency is detected.

Figure 7B:
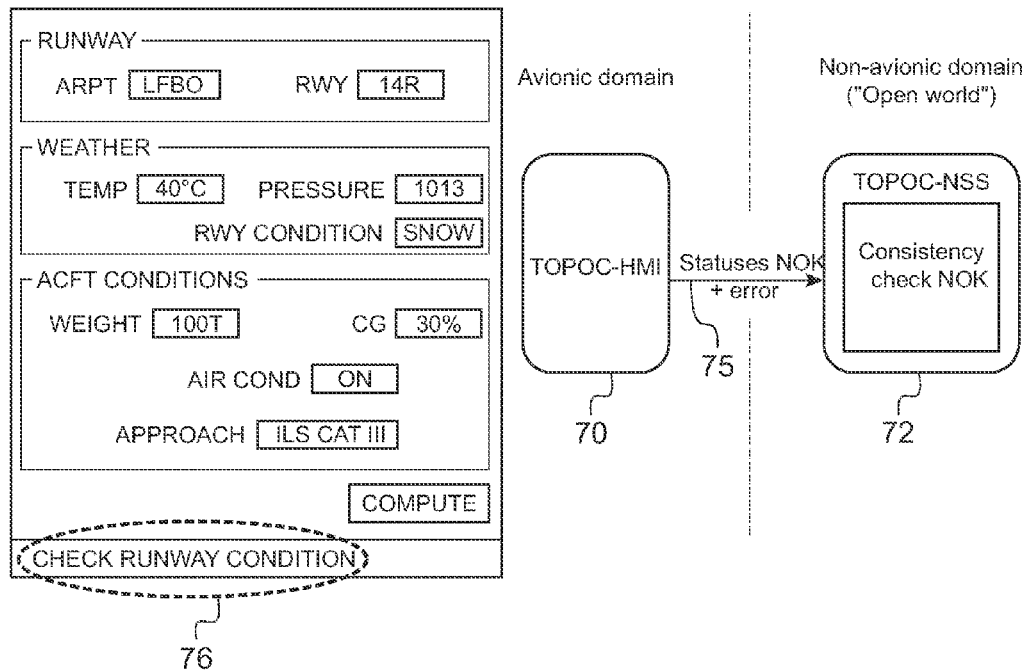

FIG. 7b, which repeats the components of FIG. 7a, presents the reaction of the system where the consistency test fails. The TOPOC-NSS module sends an error message 75 adapted to the inconsistency detected. In the example presented above, a message invites the pilot to check the runway conditions he has just entered. This is for example a message 76 "CHECK RUNWAY CONDITION". The pilot may then analyze the input data and possibly correct an error.

In addition to avoiding an error, this mechanism also enables time to be saved by avoiding launching a computation with incorrect input data.

This mechanism also makes it possible to avoid an accumulation of inconsistencies that is difficult to correct in a logical manner by the pilot and within an acceptable time.

In addition to this risk of error, there is a risk of data corruption on transfer from the avionic domain to the open world and conversely from the open world to the avionic domain.

Figure 8:
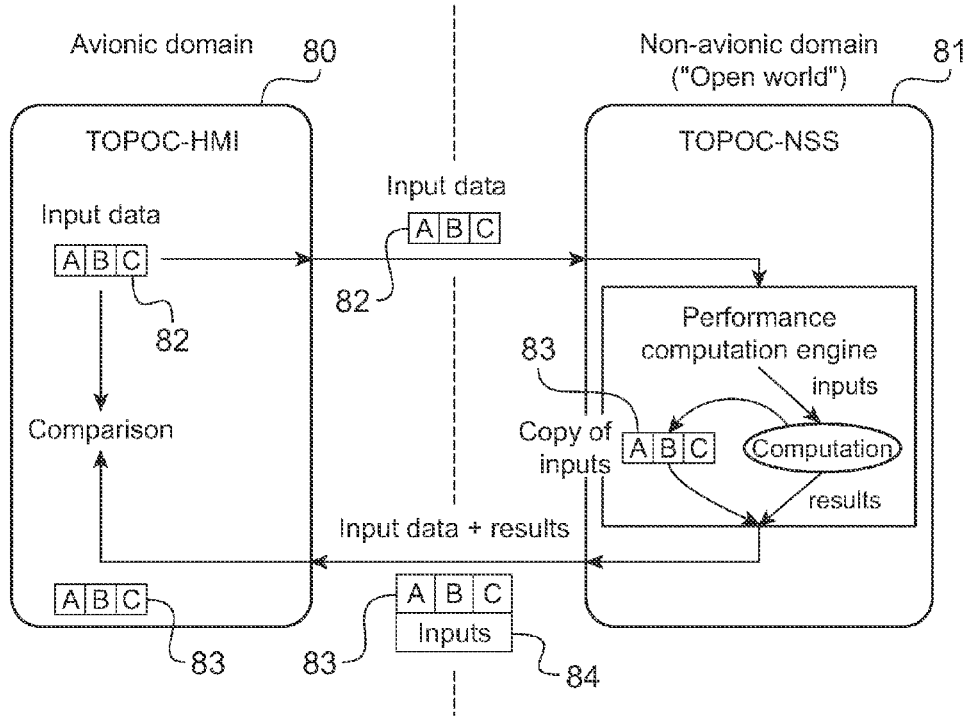
FIGS. 8 and 9 illustrate mechanisms for checking computation results.

FIG. 8 illustrates a test to limit this risk. The TOPOC-HMI configuration module 80 always checks the integrity of the input data and of the computation results of a processing operation by the TOPOC-NSS computation module 81. These mechanisms may enable a level of integrity to be obtained that is acceptable to the operational approval authorities and thus successfully pass the ORA tests (ORA standing for "Operational Risk Analysis")

The input data (computation data) 82 are sent by the TOPOC-HMI configuration module to the computation module (for example after formatting). The computation module for example makes a copy 83 of the data that it has actually used and attaches them to the computation results 84. This group is then sent to the TOPOC-HMI configuration module (for example after formatting).

Thus, on reception of the output message, the TOPOC-HMI configuration module may check that the copy of the input data correspond to what was sent to the TOPOC-NSS computation module.

If there is a match, the TOPOC-HMI configuration module can consider that the data have not been corrupted at the time of their transfer and their processing by the TOPOC-NSS computation module and thus that the computation was carried out with the right input data.

If there is no match, it is possible that the processing was carried out with corrupted input data. In this case, an error message may be displayed and the TOPOC computation may be cancelled.

Figure 9:
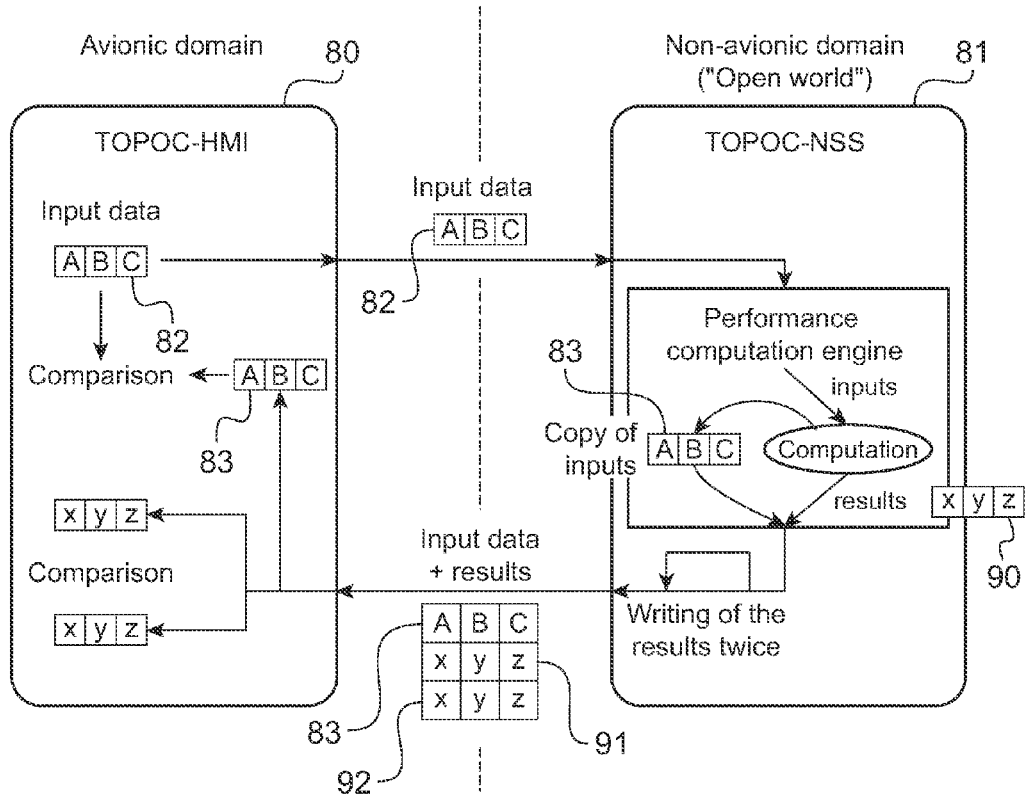

FIG. 9 illustrates the mechanism for checking the result of the parameter computation. This Figure keeps the components that are in common with FIG. 8. The computation results 90 are written twice and both copies are sent to the configuration module. For example, the results are written at two different locations 91, 92 of the same message output from the computation module TOPOC-NSS.

On reception of this message, the TOPOC-HMI configuration module checks that both recordings 91, 92 are identical.

If there is a match, the TOPOC-HMI configuration module may consider that the data have not been corrupted at the time of their transfer from the TOPOC-NSS computation module and that no copying errors occurred in the output message.

If there is not a match, the configuration module may deduce therefrom that data corruption has occurred, in which case an error message is for example displayed and the TOPOC computation is cancelled.

Below, the interface with the pilot is described in detail.

The pilot calls up the TOPOC computation function on the screen of the avionic system. The function is for example called from the FMS. It may also for example be called manually from the control panel of the avionic systems.

FIG. 10 presents the take-off performance page of the FMS. The pilot may call the TOPOC computation function by clicking on the button 100 "T.O PERF COMPUTATION".

The pilot retrieves the data useful for his computation (parameters on the runway, weather, configuration and failures of the aircraft, or other data) from the other avionic systems, for example the FMS. For example, he presses on the button "retrieve FM data" represented in FIG. 11. He may also enter these data manually or modify them. Alternatively or in combination, these data may be retrieved automatically by the configuration module.

FIG. 11 presents the take-off page ("TAKEOFF") of the performance computation software just after retrieving (automatically or manually) the data from the FMS for the full flight plan. The pilot may provide the missing information (in the example presented, this is the state of the runway 110 and the wind 111), and modify the information proposed. He has at his disposal a computation worksheet for take-off and for landing per FMS flight plan (ACTIVE, SEC1, SEC2, SEC3). FIG. 11 represents the active page for the take-off.

The pilot may thus launch computations on all the data of his FMS flight plans, or use the unused pages for rough drafts, for example to test a route.

As the pilot enters consistent input data blocks into the TOPOC-HMI configuration module, requests for checking the consistency of those blocks are sent to the TOPOC-NSS computation module.

In case of inconsistency in the input data, an error message assists the pilot in detecting and correcting the error.

FIG. 12 presents the case of a landing performance computation ("LANDING"). In this example, the pilot has selected a steep descent 120 "STEEP" with an automatic landing mode 121 "AUTOLAND", which is not a valid configuration. An error message 122 then informs the pilot of this inconsistency.

When all the data necessary for the computation have been input and are consistent, the pilot launches the computation by clicking on the button 123 ("COMPUTE").

The computations are carried out in the computation module which forms part of the open world, then the results display on the avionic screen.

In case of data corruption, an error message displays and the TOPOC computation is cancelled.

If the data are not corrupted, the pilot may consult the results in a result page illustrated by FIG. 13, and convey them to the FMS by clicking on the button 130 "INSERT IN T.O PAGE" or "INSERT IN APPR PAGE" (depending on whether the computation is a take-off or landing computation).

The TOPOC-HMI configuration module then checks that the airport 131, the runway 132 and the mass 133 (take-off or landing mass according to the type of computation) used for the computation are indeed the same as those used by the FMS. If this is not the case, an error message 134 is displayed to the pilot and the incorporation of the data into the FMS, that is to say the configuration, is cancelled. In FIG. 13, the message is that which is displayed when the runway used by the FMS flight plan and that used for the TOPOC performance computation are different.

If the data on the airport, the runway and the mass are consistent between the TOPOC computation and the FMS, the configuration module sends the computed parameters to the FMS. The FMS may then take over control of the display. The FMS may then once again check that the airport, the runway and the mass are consistent with its own data. If this is the case, the FMS displays a window enabling the pilot to make a final check of the data which will be entered into the FMS.

FIG. 14 illustrates an example of incorporation of the results into the FMS. The computed data 1400-1405 are proposed next to the existing data 1406-1411. The pilot can then compare them and ensure they are correct before taking them into account. For example, the computed data are displayed in a different color to the existing data.

In view of the above, it would appear that the bidirectional transfer of performance computation data between the open world and the avionic domain enables the advantages of an electronic computation solution in the open world to be reconciled with the ergonomics and integration capabilities of a software application integrated into the avionics.

Relative to paper documentation, the invention enables simplified use and exact employment of computation inputs, which avoids making interpolations (as on a chart) and imprecisions. Moreover, the computation approximations may be reduced for greater precision and an optimized result.

The solution described above provides fast execution of the computation and facilitates the design and the updating of the computation software thanks to the installation in the open world.

The possibility is given of performing a real-time diagnostic of the input errors thanks to the consistency test.

For the pilot, the workflow is not interrupted. The pilot can easily pass from the preparation of his flight plan on the FMS to his performance computation, on the same screen and with the same ergonomics. This also facilitates work in challenging flight conditions (turbulence or other conditions), the pilot not having to use a paper manual or a summarily attached portable computer with the risk of him being unable to constrain it and it obstructing his field of view.

The fact of using the display system (CDS) of the avionics makes it possible to provide the same interface as the other systems such as the FMS. The crew thus find themselves in a known working environment, which reduces the risk of incorrect manipulation as well as the cost of training.

The solution described above also enables the work to be automated thanks to the retrieval of the computation input data and to the exporting of the computation results with the other avionic systems.

A computer program for the implementation of a method according to an embodiment of the invention may be produced by the person skilled in the art on reading the flow charts of FIGS. 5 and 6 and the present detailed description.

Figure 15:
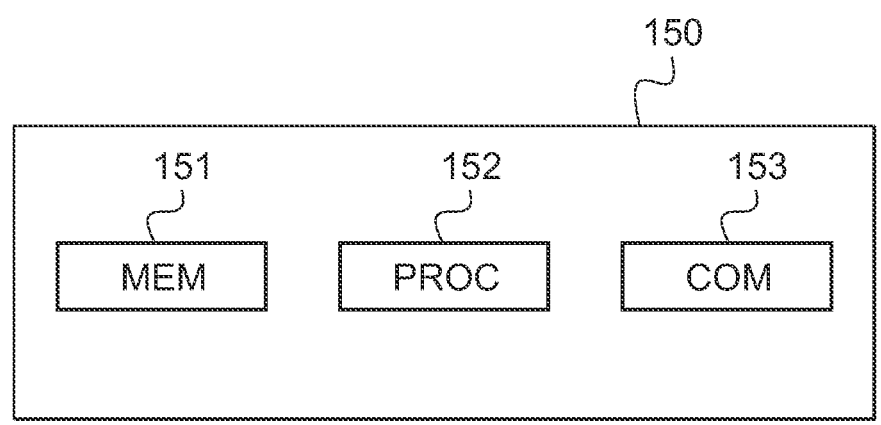
FIG. 15 diagrammatically illustrates devices according to some embodiments.

FIG. 15 illustrates a device for implementing a configuration module and/or a computation module according to embodiments. The device 150 comprises a memory unit 151 (MEM). This memory unit comprises a random access memory for temporary storage of the computation data used during the implementation of a method according to an embodiment. The memory unit furthermore comprises a non-volatile memory (for example of EEPROM type) for example for storing a computer program according to an embodiment for its execution by a processor (not represented) of a processing unit 152 (PROC) of the system. The memory may also store other data referred to above.

The device furthermore comprises a communication unit 153 (COM) for implementing communications, for example for communicating with avionic systems, databases, or other entities, as referred to above.

A system according to embodiments may comprise a configuration module and a computation module each having a structure as described with reference to FIG. 15 to operate as described in detail above.

The present invention has been described and illustrated in the present detailed description with reference to the appended Figures. However the present invention is not limited to the embodiments presented. Other variants, embodiments and combinations of features may be deduced and implemented by the person skilled in the art on reading the present description and appended Figures.

To satisfy specific needs, a person competent in the field of the invention will be able to apply modifications or adaptations.

In the claims, the term "comprise" does not exclude other elements or other steps. The indefinite article "a" does not exclude the plural. A single processor or several other units may be used to implement the invention. The different features presented and/or claimed may advantageously be combined. Their presence in the description or in different dependent claims, does not indeed exclude the possibility of combining them. The reference signs are not to be understood as limiting the scope of the invention.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A method of configuring an aircraft management system comprising the following steps, implemented by a configuration module integrated into an avionic system of an aircraft cockpit:

obtaining at least one item of computation data for computing at least one configuration parameter of said management system, sending, to a computation module that is independent from the avionic system of the aircraft cockpit, a request for said computation module to compute said at least one configuration parameter on the basis of said at least one item of computation data, receiving, from said computation module, said at least one configuration parameter computed by said computation module using said at least one item of computation data, checking whether said at least one item of computation data is consistent with corresponding data already present in said management system, and configuring said management system with said at least one received computed configuration parameter if said at least one item of computation data and said corresponding data are consistent.

2. The method according to claim 1, further comprising, prior to sending said computing request, a step of sending, to said computation module, a request to check consistency of said at least one item of computation data, and wherein the computing request is sent, according to said consistency check.

3. The method according to claim 2, wherein, said consistency check request concerns a block of a plurality of items of computation data.

4. The method according to claim 1, further comprising, further to receiving said at least one computed parameter, a step of checking for corruption of the items of computation data.

5. The method according to claim 4, wherein, said at least one computed parameter is accompanied by at least one item of computation data, and wherein said step of checking for corruption of the items of computation data includes comparing said at least one determined item of computation data and said at least one item of computation data.

6. The method according to claim 1, further comprising a step of checking the integrity of said at least one received computed parameter.

7. The method according to claim 6, wherein said integrity check includes a comparison of two records, of the same at least one computed parameter, received from the computation module.

8. The method according to claim 1, wherein said obtaining step includes receiving said at least one item of computation data via a user interface of the configuration module.

9. The method according to claim 1, wherein said obtaining step includes receiving said at least one item of computation data via an interface for communication with a computation data supply module.

10. A computer program comprising instructions for implementing a method according to claim 1 when the program is loaded into and executed by a processor of a device or of a system for configuring an aircraft management system.

11. A device for configuring an aircraft management system, said device being integrated into an avionic system of an aircraft cockpit, the device comprising:

a processing unit configured to obtain at least one item of computation data for computing at least one configuration parameter of the management system, the processing unit being furthermore configured to configure said management system with at least one received computed parameter, and a communication unit configured to send, to a computation module independent from the avionic system of the aircraft cockpit, a request for said computation module to compute said at least one configuration parameter on the basis of said at least one item of computation data, the communication unit being furthermore configured to receive, from said computation module, said at least one configuration parameter computed by said computation module using said at least one item of computation data, and wherein the processing unit is configured to check whether said at least one item of computation data is consistent with corresponding data already present in said management system, and configure said management system with said at least one computed configuration parameter if said at least one item of computation data and said corresponding data are consistent.

12. A system for configuring an aircraft management system comprising:

a configuration device integrated into an avionic system of a cockpit of an aircraft, the configuration device comprising:

a processing unit configured to obtain at least one item of computation data for computing at least one configuration parameter of the management system, the processing unit being furthermore configured to configure said management system with at least one received computed parameter, and a communication unit configured to send, to a computation device independent from the avionic system of the aircraft cockpit, a request for said computation device to compute said at least one configuration parameter on the basis of said at least one item of computation data, the communication unit being furthermore configured to receive, from said computation device, said at least one configuration parameter computed by said computation module using said at least one item of computation data, and the system further comprising:

said computation device independent from the avionic system of the aircraft cockpit, the computation device comprising:

another processing unit configured to compute, on the basis of said at least one item of computation data, said configuration parameter, and another communication unit configured to receive, from the communication unit, said computing request, and to send, to said configuration device, said computed configuration parameter, and wherein the processing unit is configured to check whether said at least one item of computation data is consistent with corresponding data already present in said management system, and configure said management system with said at least one received computed configuration parameter if said at least one item of computation data and said corresponding data are consistent.

13. An aircraft comprising a device according to claim 11.

14. An aircraft comprising a system according to claim 12.

15. A method of configuring an aircraft management system comprising the following steps:

obtaining at least one item of computation data for computing at least one configuration parameter of said management system, sending, to a computation module that is independent from an avionic system of an aircraft cockpit, a request for said computation module to compute said at least one configuration parameter on the basis of said at least one item of computation data, receiving, from said computation module, said at least one configuration parameter computed by said computation module using said at least one item of computation data, wherein said at least one configuration parameter is accompanied by said at least one item of computation data, checking for corruption of said at least one item of computation data, wherein said step of checking includes comparing said at least one item of computation data with corresponding data already present in said management system, and configuring said management system with said at least one received computed configuration parameter.

* * * * *